United States Patent [19]

Ayano et al.

[11] Patent Number: 4,588,860
[45] Date of Patent: May 13, 1986

[54] BATTERY FEED CIRCUIT FOR TELEPHONE SUBSCRIBER LINE

[75] Inventors: Mitsutoshi Ayano, Tokyo; Kiyoshi Shibuya, Kawasaki; Shin-ichi Itou, Tokyo; Kenji Takatou; Toshiro Tojo, both of Kawasaki, all of Japan

[73] Assignee: Fujitsu Limited, Kawasaki, Japan

[21] Appl. No.: 566,476

[22] Filed: Dec. 28, 1983

[30] Foreign Application Priority Data

Dec. 30, 1982 [JP] Japan ................................ 57-233825

[51] Int. Cl.$^4$ .......................................... H04M 19/00
[52] U.S. Cl. .................................... 179/77; 179/16 F; 179/18 FA
[58] Field of Search ........... 179/18 FA, 16 AA, 16 F, 179/70, 77, 170 NC

[56] References Cited

U.S. PATENT DOCUMENTS

| | | | |
|---|---|---|---|
| 4,088,843 | 5/1978 | Rogers et al. | 179/70 |
| 4,130,735 | 12/1978 | Chambers, Jr. et al. | 179/16 F |
| 4,272,656 | 6/1981 | Nishikawa | 179/170 NC |
| 4,283,604 | 8/1981 | Chambers, Jr. | 179/70 |
| 4,292,478 | 9/1981 | Davis et al. | 179/170 NC |
| 4,315,106 | 2/1982 | Chea, Jr. | 179/16 F |
| 4,315,207 | 2/1982 | Apfel | 323/284 |
| 4,357,495 | 11/1982 | Sweet et al. | 179/77 |
| 4,359,609 | 11/1982 | Apfel | 179/16 F |
| 4,387,273 | 6/1983 | Chea, Jr. | 179/16 F |
| 4,388,500 | 6/1983 | Regan | 179/170 NC |
| 4,476,350 | 10/1984 | Aull et al. | 179/70 |

Primary Examiner—Gene Z. Rubinson
Assistant Examiner—R. Vaas
Attorney, Agent, or Firm—Staas & Halsey

[57] ABSTRACT

A battery feed circuit for a two-wire telephone subscriber line is miniaturized by an electronic integrated circuit without a transformer. The electronic battery feed circuit is composed of first and second operational amplifiers, output resistors, a DC voltage feedback loop, an AC signal feedback loop and a switching power supply. The switching power supply means is to control the power source voltage of the first operational amplifier, corresponding to the length of the subscriber line loop and the status of a telephone set in the loop. Low power consumption of the circuit is attained as follows. Most of power loss of the circuit can be separated as between the amplifiers and the output resistors. The loss of the output resistors are reduced by using small resistances, and the loss of the second amplifier is reduced by using a small DC bias. The loss of the first amplifier is reduced by setting its power source voltage to several volts lower than output voltage of the switching power supply. The switching power supply is composed of a zener diode, two comparators and a switching transistor circuit.

14 Claims, 7 Drawing Figures

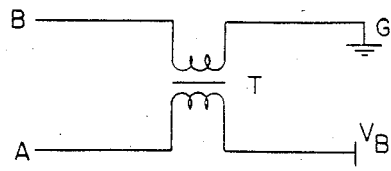
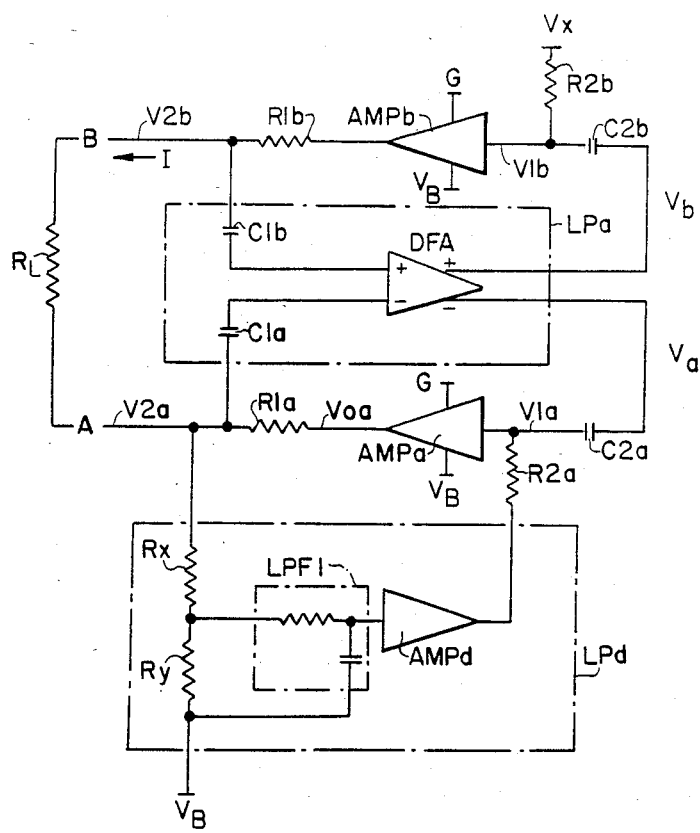

BATTERY FEED CIRCUIT FOR TELEPHONE SUBSCRIBER LINE

BACKGROUND OF THE INVENTION

This invention relates to a telephone subscriber line circuit and, more particularly, to a battery feed circuit of small size and low power consumption for a digital telephone electronic switching system.

A battery feed circuit is used in a telephone switching system to supply direct current from a battery power supply to a two-wire subscriber loop which transmits voice signals to and from a telephone transmitter/receiver.

In a digital telephone switching system, as shown in FIG. 1, a subscriber line circuit is located between the subscriber line and the switching network. The subscriber line circuit has "BORSCHT" functions (Battery power feed to subscriber line, Overvoltage protection from subscriber line, Ringing to telephone set, Supervision of status of line loop, Coder and decoder of telephone signal, Hybrid circuit to convert between a two-wire and a four-wire system, and Testing) and a battery feed circuit, and is provided for each subscriber line. This includes the circuits for the "BORSCHT" functions as indicated by the components labelled with the respective letters $B_1$, $\overline{O}$, R, S, C, H and T in FIG. 1.

The total number of battery feed circuits needed in a system is equal to the number of the subscriber lines. In a large capacity digital system which accomodates many subscriber lines, therefore, a battery feed circuit of small size and low power consumption is essential for designing compact subscriber line equipment.

As the battery feed circuit of low power consumption, the constant current feed circuit and the floating battery feed circuit are well known. However, the former circuit has the problems of producing excessive heat loss in the circuit and of losing the automatic gain control (AGC) function of a telephone transmitter circuit for a telephone set.

The floating battery feed circuit has the problems of being bulky because a large transformer is used in the power supply circuit and of aggravating the problem with the AGC function of a telephone circuit, because the power feed characteristics are different from the characteristics of a constant resistance power feed.

A constant resistance power feed has been used since the availability of an early type of analog system, and is preferrable for the AGC function of a telephone set and for protection of the power feed circuit from large currents in the case of an accident on the subscriber line.

There are two types of known circuits of constant resistance power feed, namely a transformer circuit and an electronic circuit.

A transformer circuit of the prior art is shown in FIG. 2. The circuit includes a large transformer T with two windings. The first winding is connected between a first wire A of a subscriber line and a negative terminal $V_B$ of a battery, and the other winding is connected between a second wire B and the positive-grounded terminal G of the battery.

It is required for the battery power feed circuit to have a high impedance with respect to an alternating current (AC) telephone signal and a constant impedance with respect to direct current (DC) voltage. Low impedance for an AC induction noise signal is also required.

In a transformer circuit, a high impedance to the AC telephone signal is easily realized by providing the inductance L with a large value, because the AC impedance is given by $2\pi f L$, wherein f is the frequency of the AC signal. The DC impedance of the transformer is the resistance of the windings. Therefore, it is easy to obtain the desired resistance of the transformer. A small value of the impedance for the induction noise is realized by choosing the direction of the two windings to be such that the magnetic flux of each winding cancels that of the other. The AC impedance for the induction noise, looking from wires A and B towards the transformer, therefore is equal to the sum of the DC resistances of the two windings.

Thus, the transformer circuit fulfills all of the requirements for the power feed circuit. However, miniaturization of the transformer is a problem.

An example of the electronic type power feed circuit according to the prior art is shown in FIG. 3. It is composed of a first operational amplifier AMPa, a second operational amplifier AMPb, first and second output resistors R1a, R1b, a feedback loop LPa for an AC signal and a feedback loop LPd for a DC voltage, wherein each of these two feedback loops is encircled in a respective chained line in FIG. 3.

The AC feedback loop LPa is composed of a differential amplifier DFA and coupling capacitors C1a and C1b. The DC feedback loop LPd is composed of the resistors Rx and Ry, a first lowpass filter LPF1 and a third operational amplifier AMPd. The reference characters $V_x$ and $V_B$ indicate respective power supply voltages and G is ground.

The operational amplifiers AMPa, AMPb and AMPd are of the so-called voltage follower type, wherein the output terminal of each of these operational amplifiers is directly connected to a respective negative-going input terminal (not shown). Each has the characteristics of unitary voltage gain, non-conversion of polarity, extremely high input imedance and extremely low output impedance.

The wire A and the wire B indicate a two-wire subscriber line, to which DC current is supplied by the battery feed circuit. Since the operational amplifiers AMPa and AMPb have unitary voltage gain, each supplies the same output voltage as the respective input voltage V1a and V1b to the respective wires A and B via the respective resistors R1a and R1b.

The DC path for the subscriber loop is composed of the following serially connected elements:
the positive grounded terminal of a battery (not shown);
the positive power supply terminal G of the operational amplifier AMPb;
the operational amplifier AMPb,
the resistor R1b;
the connection point to the second wire B of the subscriber line;
the second wire B of the subscriber line (not shown);
a telephone transmitter/receiver set (not shown);
the first wire A of the subscriber line (not shown);
the connection point to the first wire A of the subscriber line;
the first output resistor R1a;
the output terminal of the AMPa;
the negative power supply terminal of the AMPa; and
the negative terminal $V_B$ of a battery (not shown).

The operational principle of the AC feedback loop with a differential amplifier circuit was already disclosed in U.S. Pat. No. 4,007,335.

On the wires A and B, the voltages V2a and V2b include the telephone signals corresponding to the AC signals superimposed on the respective DC voltages. The AC components of V2a, V2b are coupled to the differential amplifier DFA having unity gain through the respective capacitors C1a and C1b. The differential amplifier DFA also has unity gain and provides the following two signal outputs:

$$Va = -\{(V2b - V2a)\}ac/2$$

$$Vb = \{(V2b - V2a)\}ac/2$$

wherein {} ac denotes the AC component of the term in the curly brackets. The output signals Va, Vb are respectively supplied to the operational amplifiers AMPa and AMPb through the capacitors C2a and C2b.

The values of the resistances R2a and R2b and of the capacitances C2a and C2b are determined by requiring that:

$$2\pi f\, C2a\, R2a >> 1$$

$$2\pi f\, C2b\, R2b >> 1$$

The AC components of the signals V1a and V1b supplied to the operational amplifiers AMPa and AMPb are respectively:

$$\{V1a\}ac = -\{(V2b - V2a)\}ac/2,$$

$$\{V1b\}ac = \{(V2b - V2a)\}ac/2,$$

The telephone signal is thusly transmitted in balanced mode on the subscriber line in a manner for which $\{V2a\}ac = -\{V2b\}ac$. Thus the telephone signal can be discriminated from induced noise for which the respective voltages are $\{V2b\}ac = \{V2a\}ac$.

The AC components of the output voltages of the operational amplifiers AMPa and AMPb are, therefore, $\{V2a\}ac$ and $\{V2b\}ac$, respectively. Therefore, the AC output impedances Za(ac) and Zb(ac) of the respective operational amplifiers AMPa and AMPb as seen from wires A and B are very large, since:

$$Za(ac) = \{V2a/((V2a - V2a)/R1a)\}ac = \infty$$

$$Zb(ac) = \{V2b/((V2b - V2b)/R1b)\}ac = \infty$$

The fixed bias voltage Vx is applied to the operational amplifier AMPb at its input terminal through a high resistance resistor R2b. The value of the bias voltage Vx is determined to be larger than the sum of the saturation voltage of the operational amplifier AMPb and the AC signal voltage applied to its input terminal.

Since the operational amplifier AMPb has unitary voltage gain and has no DC voltage feedback loop, it outputs a DC voltage of the same amplitude as the input DC voltage, and it has an extremely low output DC impedance. That is, the operational amplifier AMPb can be considered as a voltage source having a constant voltage Vx and to have zero output impedance.

Since the operational amplifier AMPa is connected to the DC voltage feedback loop, the output DC voltage of the operational amplifier AMPa varies with the output voltage of the DC feedback loop LPd. The output of the DC feedback loop LPd is connected to the first wire A of the subscriber line.

The resistors Ry and Rx in the loop LPd pick up the line voltage V2a and supply the divided voltage V2a Ry/(Rx+Ry) to the lowpass filter LPF1 which eliminates the AC component from the divided voltage, namely the lowpass filter LPF1 supplies only the DC component {V2a Ry/(Rx+Ry)} dc of the divided voltage to the operational amplifier AMPd.

Since the operational amplifier AMPd is a voltage follower, it provides the same amplitude and polarity as the input DC voltage transmitted by the LPF1. The DC output voltage of the operational amplifier AMPd is supplied to the operational amplifier AMPa, which provides an output of the same voltage and polarity as the input thereto.

The output DC voltage Voa of the operational amplifier AMPa is:

$$Voa = V1a = \{V2a \cdot Ry/(Rx+Ry)\}dc$$

The DC impedance Za(dc) looking from the wire A towards the operational amplifier AMPa is given as:

$$\begin{aligned}Za(dc) &= \{V2a/((V2a - Voa)/R1a)\}dc \\ &= \{V2a/((V2a - V1a)/R1a)\}dc \\ &= \{V2a\, R1a/((V2a - \{(V2a \cdot Ry)\}/(Rx + Ry))\}dc \\ &= R1a/(1 - Ry/(Rx + Ry)) \\ &= R1a(1 + Ry/Rx)\end{aligned}$$

The DC impedance Zb(dc) looking from the wire B towards the operational amplifer AMPb is:

$$Zb(dc) = R1b$$

Therefore the total DC impedance Zdc of the battery feed circuit is:

$$Zdc = R1b + R1a(1 + Ry/Rx)$$

In conclusion, the AC impedance for the telephone signal is infinite and the DC impedance for the DC voltage can be set to a specified value by choosing the values of the resistances.

The impedance of the battery feed circuit for the induction noise signal also can be low, because the induction noise signal, such as a 60 Hz power line induction, is removed by the differential amplifier DFA and the lowpass filter LPF1. The impedance for the induction noise signal as seen from the two wires A and B is R1a+R1b. The values of the resistors R1a and R1b are selected to be small values to reduce the heat loss in the resistors.

In the prior art battery feed circuit of FIG. 3, the total impedance Zdc as described above is:

$$Zdc = R1b + R1a(1 + Ry/Rx)$$

and Zdc is usually set to 400 or 440 ohms.

In order to reduce the DC power consumption of the circuit, therefore, it is necessary to select small values of the output resistors R1a and R1b, and a large ratio for the values of resistors Rx and Ry.

The output voltage of the operational amplifier AMPb is a fixed voltage Vx, so that power consumption of the operational amplifier AMPb can be reduced by selecting a small value for the bias voltage Vx. The output voltage of the operational amplifier AMPa is given by the product of the DC current I of the subscriber line loop and R1a(Ry/Rx), wherein I is given by:

$$I=(V_B-V_x)/(R_L+R1b+R1a(1+Ry/Rx))$$

and $R_L$ is the load resistance of the subscriber line loop, which includes a resistance of R1 of the two-wire subscriber line and a resistance Rt of a telephone set. The resistance Rt of a telephone set is about 100 ohms. Therefore, the load resistance $R_L$ ranges from 100 to 1900 ohms when the telephone set is in the off-hook status. Needless to say, when the telephone set is in the on-hook status, the load resistance $R_L$ is infinite and the current I is zero.

When the length of the line is very short, that is, when the resistance R1 is negligibly small, then the resistance $R_L$ is 100 ohms. On the other hand, the power supply $V_B$ is usually −48 volts, and the bias voltage Vx is set to about 3 volts, which yields a maximum for the loop current I of:

$$I_{max}=(48-3)v/(100+400)ohm=90ma$$

The total power loss of the circuit for a current $I_{max}$ of 90ma is $$(90\times10^{-3})^2\times400=3.24w$$

When the sum $R1a+R1b$ of the output resistors is set to 100 ohms, the power loss in the operational amplifier AMPa is $3.24\ w\times\frac{3}{4}=2.43\ w$. The power loss of 2.43 w in the operational amplifier AMPa is too large to make the power feed circuit by integrated circuit (IC) technology.

The electronic circuit of FIG. 3 could be made smaller in size but the power consumption of the circuit is still a problem.

SUMMARY OF THE INVENTION

The object of the present invention, therefore, is to provide a battery feed circuit of small size and low power consumption, one that is suitable for fabrication by IC technology.

The foregoing object is accomplished by the following considerations. Losses can be separated as between amplifiers and output resistors. At first the losses of the output resistors are reduced by using small resistances. The loss of the operational amplifier AMPb is reduced by selecting a small voltage for the DC bias. When these reductions are accomplished, the loss is concentrated in the operational amplifier AMPa. The loss in the operational amplifier AMPa is reduced by setting its power source voltage to several volts lower than that of its output voltage which is varied by the load resistance of a subscriber line.

The present invention is accomplished by adding another feedback loop which includes a voltage regulator, wherein the voltage regulator varies its output voltage by means of a zener diode, comparators and a switching transistor circuit.

The circuit and principle for attaining the above-mentioned process will become clear by the following description of the preferred embodiments and the accompanying drawings.

BRIEF DESCRIPTION OF THE DRAWINGS

FIG. 2 is a schematic circuit diagram of a prior art transformer battery feed circuit;

FIG. 3 is a block diagram of a prior art electronic battery feed circuit;

DETAILED DESCRIPTION OF THE PREFERRED EMBODIMENTS

Figure 4:
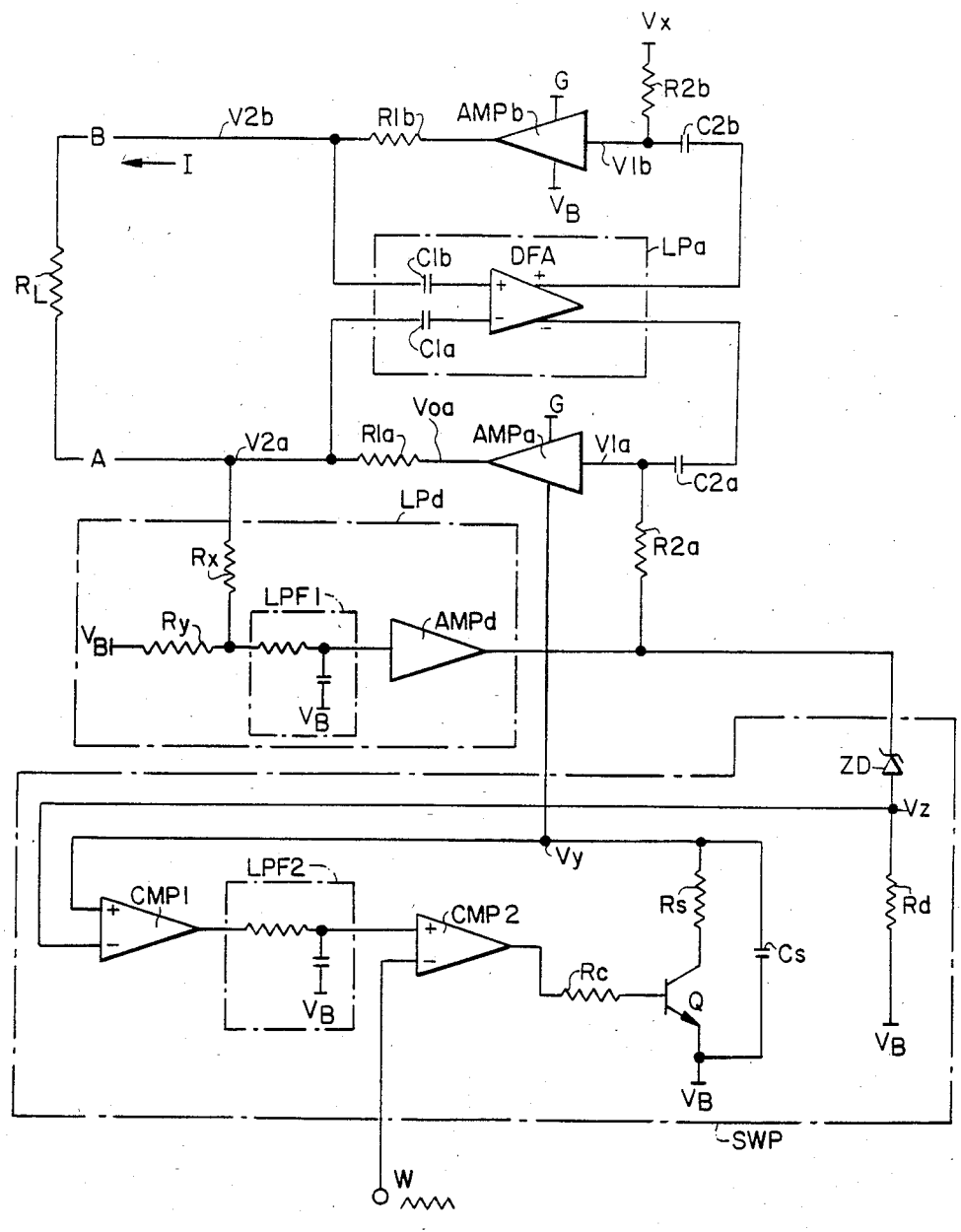
FIG. 4 is a block diagram of a preferred embodiment of battery feed circuit according to the present invention.

FIG. 4 shows schematically a circuit diagram of a battery feed circuit according to the present invention. In contrast to the circuit of FIG. 3, it includes the switching regulator circuit SWP encircled by a chained line.

The switching regulator SWP is composed of a zener diode ZD, a first comparator CMP1, a second comparator CMP2, a second low pass filter LPF2 and a switching transistor circuit as illustrated.

The zener diode ZD provides a reference DC voltage to the first comparator. The cathode of the zener diode ZD is connected to the output of the operational amplifier AMPd, and the anode of the zener diode ZD is connected to the battery terminal $V_B$ through a resistor Rd. The anode voltage Vz of the zener diode ZD is always kept lower than the cathode voltage by a definite amount, namely by the zener voltage Vzd.

The anode voltage Vz is applied to the negative (−) input terminal of the comparator CMP1. The other (+) input terminal of the comparator CMP1 is connected to the power supply terminal of the operational amplifier AMPa, and is supplied with the output voltage Vy of the switching regulator circuit SWP.

The voltage Vy is compared by the comparator CMP1 with the voltage Vz. The comparator CMP1 outputs a high voltage V(c) when the voltage Vy is higher than the voltage Vz, and provides a low voltage V(b) when the voltage Vy is lower than the voltage Vz. The DC voltages V(b) and V(c) are nearly equal to respective negative (−48 volts) and positive (0 volts) power supply voltages of the comparator CMP1.

The DC voltage V(b) or V(c) output from the comparator CMP1 is filtered by a second low pass filter LPF2 to eliminate any remaining AC components. Then it is applied to the positive input terminal of the second comparator CMP2 for comparison with a reference wave signal W supplied to the other (−) input terminal of the second comparator CMP2.

Figure 1:
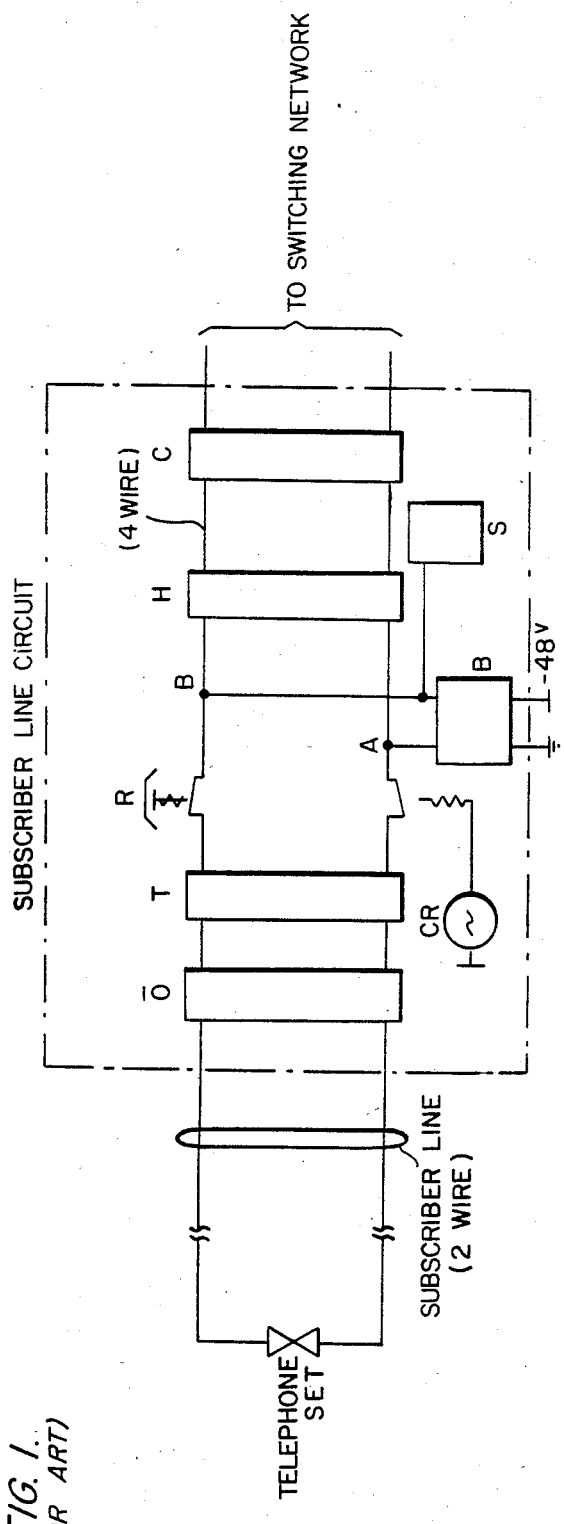
FIG. 1 is a block diagram schematically illustrating a prior art subscriber circuit.
Figure 5:
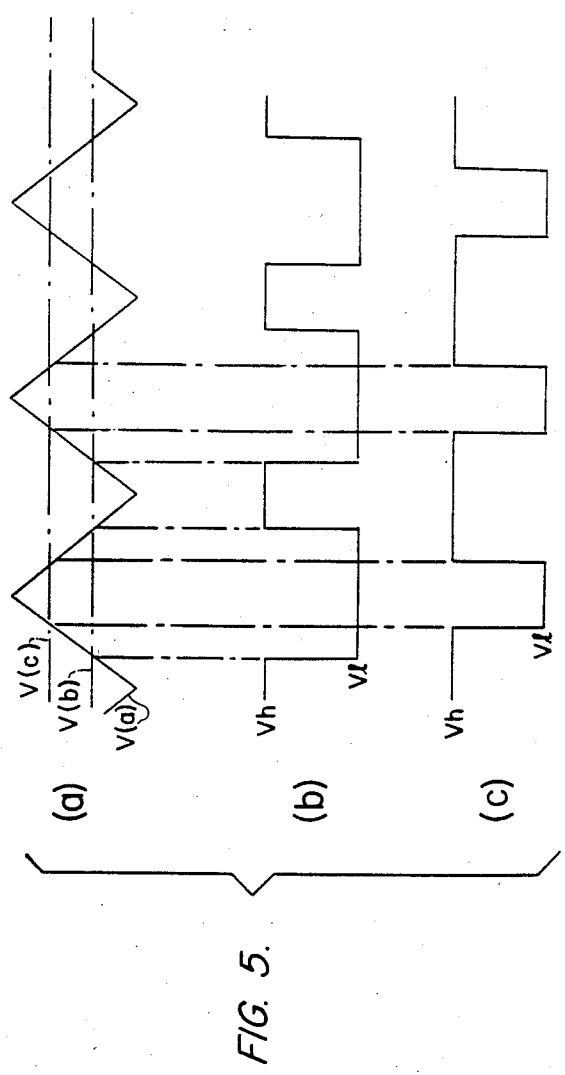
FIG. 5(a) shows a reference wave signal with a triangle waveform.
FIG. 5(b) is a waveform of a rectangular wave output signal from the second comparator, corresponding to the low input voltage V(c)
FIG. 5(c) is a waveform of a rectangular wave output signal from the second comparator, corresponding to the high input voltage V(c).

The reference wave signal W is a triangular wave or a sawtooth wave. The comparator CMP2 outputs a rectangular wave having a high level $V_h$ and a low level $V_l$. FIG. 5(a) shows a waveform of the reference wave signal W, namely with a triangular waveform. When the input voltage to the positive terminal of the comparator CMP2 is at the low voltage V(b), the output of the comparator CMP2 becomes a rectangular wave as shown in FIG. 5(b), wherein the duration of the low level $V_l$ is longer than that of the high level $V_h$. When the input voltage to the positive terminal varies to the high voltage V(c), the output of the comparator CMP2 varies to a rectangular wave as shown in FIG. 5(c), wherein the duration of the low level $V_l$ is shorter than that of the high level $V_h$.

The rectangular wave output from the comparator CMP2 is applied to the switching transistor circuit. In the switching transistor circuit, the rectangular wave signal is supplied to the base electrode of an npn transistor Q through the resistor Rc. When the rectangular wave input is at the high level $V_h$ the transistor Q flows the collector current. When the rectangular wave input is at the low level $V_l$ the collector current is cut off.

In the transistor circuit, the resistor Rs is connected in the collector circuit between the collector electrode and the output terminal of the switching regulator circuit SWP. The capacitor Cs is connected between the emitter electrode and the output terminal of the switching regulator circuit SWP, and the emitter electrode is connected to the negative battery terminal $V_B$.

When the transistor Q is cut off, that is, when the rectangular wave input to the transistor Q is at the low level $V_1$, the capacitor Cs is charged through the ground terminal G of the operational amplifier AMPb, the operational amplifier AMPb, the resistor R1b, the subscriber line loop, the resistor R1a, the operational amplifier AMPa, the capacitor Cs and the battery $V_B$. The total DC resistance of the path is Zdc.

When the transistor Q is conducting, that is, when the rectangular wave input thereto is at the high level $V_h$, the charge of the capacitor Cs is discharged through the resistor Rs, the collector electrode, the emitter electrode and the battery terminal $V_B$.

When the capacitor Cs is discharged, the output voltage Vy goes down. On the contrary, when the capacitor Cs is charged, the output voltage Vy goes up.

The change in the output voltage Vy is fed back to the input of the first comparator CMP1. This feedback loop is operated so as to reduce the difference voltage Vy−Vz. The operation of the loop circuit is repeated in accordance with the input rectangular pulse train, and a definite voltage Vy equal to the voltage Vz is established as an output voltage of the switching regulator circuit SWP.

Since the cathode of the zener diode ZD is connected to the output terminal of the operational amplifier AMPd, and since the output terminal of the operational amplifer AMPd is connected to the input of the operational amplifer AMPa having extremely high input impedance by a high but relatively significantly lower resistance resistor R2a, the input voltage V1a of the operational amplifier AMPa is equal to the cathode voltage of the zener diode ZD.

Moreover, as the operational amplifier AMPa has a unitary voltage gain, its output voltage Voa is equal to its input voltage V1a. As a result, the output voltage Voa of the operational amplifier AMPa is higher than the voltage Vz by a definite voltage Vzd. On the other hand, the voltage Vy output by the switching regulator SWP circuit is applied to the operational amplifier AMPa as its power supply voltage. Accordingly, the power supply voltage of the operational amplifier AMPa is kept lower by a definite voltage Vzd than its output voltage Voa, namely:

$$Vy = Voa - Vzd.$$

This relationship is maintained even if the voltage V1a is varied due to change of the load resistance $R_L$ of the subscriber line loop.

As mentioned before, the major power loss of the circuit of FIG. 4 occurs at the first operational amplifier AMPa, the internal power loss of which is:

$$I(Voa - Vr) = I\, Vzd,$$

In the circuit of FIG. 4, the zener voltage Vzd is selected to be a small value in order to reduce power consumption. For instance, a zener voltage Vzd of about 3 volts is selected for a preferred embodiment.

When the length of the subscriber line is very short, as mentioned above in reference to FIG. 3, the DC current I of the line loop is 90 ma. The output resistors R1a and R1b are selected to be small, in a range for which the phase difference of an AC signal between the input and output of each resistor is negligibly small, for instance so that R1a+R1b=100 ohms.

The DC bias Vx to the operational amplifier AMPb is given to be equal to the sum of the saturation voltage of the operational amplifier AMPb and the AC voltage from the AC feedback loop LPa, for example 3 volts. Under these conditions, the internal power loss of the operational amplifier AMPa will be 0.09 A×3 V=0.27 w. In comparison with the power loss of 2.43 w of the prior art circuit of FIG. 3, a drastic reduction of power loss is attained.

Besides the power loss described above, additional power loss of the switching regulator circuit SWP must be considered. The power loss of the transistor Q, the resistor Rs, and the capacitor Ca must be considered, because they are in the current path of the power feed circuit.

The transistor Q is operated by the rectangular wave so that the time that the collector current is in the off state is longer than in the on state, to provide the result that power consumption of the transistor Q itself is very low. While a low value of the resistor Rs is desirable from the point of view of power loss, the value of the resistor Rs should be as high as possible to prevent the capacitor Cs from damage due to a large discharge current.

However, too high value for the resistor Rs is not desirable from the point of view of a DC power supply, considering the internal DC resistance Zdc of the battery feed circuit which is selected to be 400 or 440 ohms. From this consideration, the resistor Rs should be less than 400 ohms, and preferably 100 ohms is selected.

Moreover, determination of the value of the resistor Rs is made in relation with the capacitor Cs, in consideration of the time constant CsRs and the switching frequency f of the transistor Q for the rectangular wave input signal.

Determination of the capacitor Cs is made from the allowable ripple voltage Vr, which is given by the idle channel noise requirement (−70 dBm in general) and the ripple rejection characteristics of the battery feed circuit (20 dB in general). The calculated result is Vr=2.45×10$^{-3}$ (volt).

The capacitance of the capacitor Cs is related to the voltage drop along the charging path including the operational amplifiers AMPb and AMPa and the resistors R1b and $R_L$ as follows, $$2Vr = (1 - e^{-t/C_sR})V_B,$$

wherein $$R = R_{1a} + R_{1b} + R_L.$$

For $V_B = 48$ v, $V_r = 2.45 \times 10^{-3}$ v and $T = 1/f$:

$$e^{-T/C_sR} = 1 - 4.9 \times 10^{-3}/48$$

and $$T/C_sR = 102 \times 10^{-6}.$$

If $R = 200$ ohms, then $C_s = T \times 10^3/20.4$.

If the switching frequency f is 256 kHz, the capacitor Cs must be more than 200 μF to meet the noise requirement.

The switching frequency of 256 kHz is selected so that the size of the capacitor Cs is not so large, and at the same time, the frequency 256 khz is selected to be a multiple of the sampling frequency, such as 8 kHz, of the pulse code modulation (PCM) coding, namely 256 kHz = 32 × 8 kHz, to avoid the interference with the PCM telephone signal.

As has been described above, it is possible to reduce the power loss of a battery feed circuit drastically by using the circuit of the present invention. It also becomes possible to realize a small power consumption and a small size for a battery feed circuit which is suitable to be provided as an IC, or moreover as a large scale integrated circuit (LSI).

We claim:

1. A battery feed circuit for supplying DC current to a two-wire subscriber line, comprising
   first and second amplifiers respectively connected to first and second ones of the two wires of said subscriber line, for providing said first and second wires with respective DC voltages, said first amplifier having a power source terminal for supplying a power source voltage thereto,
   first and second output resistors respectively connected between outputs of said first and second amplifiers and said first and second wires, for providing each said amplifier with a respective output impedance for the respective wire,
   a DC voltage feedback loop having as an input a connection to at least said first wire, and having an output for feeding back a DC voltage proportional to the DC voltage of said first wire to said first amplifier, and
   a switching power supply for comparing said power source voltage supplied to said first amplifier with a voltage corresponding to the output of said DC voltage feedback loop, and for controlling said power source voltage to be lower than the voltage of said output of said DC voltage feedback loop, wherein said switching power supply includes:
   a zener diode connected between said power source terminal and said output of said DC voltage feedback loop, for providing a DC reference voltage as said voltage corresponding to the output of said DC voltage feedback loop;
   a reference signal generator for generating a reference wave signal;
   a first comparator means for comparing said power source voltage with said DC reference voltage, and for outputting a respective high or low voltage depending on whether said power source voltage is higher or lower than said DC reference voltage;
   a second comparator means for comparing said high or low voltage with said reference wave signal, and for outputtting at an output a rectangular wave having a broad or narrow width in respective corresponding to said high or low voltage output from said first comparator means; and
   a switching transistor circuit means, including a transistor, a capacitor and first and second resistors, said first transistor being connected to said output of said second comparator means, said power source voltage being supplied by switching the collector current of said transistor in accordance with said rectangular wave supplied to said transistor via said first resistor, said capacitor being supplied with a discharge path through said second resistor, and said capacitor being charged by a charging path having a respective time constant and which includes said first and second amplifiers.

2. The circuit of claim 1 comprising an AC feedback loop including amplifier means for differentially amplifying AC components of the signals on said first and second wires and for respectively feeding the amplified AC components back to said first and second amplifiers.

3. The circuit of claim 1 or 2, wherein each of said first and second amplifiers is an operational amplifier having the characteristics of unitary voltage gain, non-conversion of polarity and effectively infinite input impedance and zero output impedance.

4. The circuit of claim 1 or 2 wherein each of said first and second output resistors is provided with a small resistance.

5. The circuit of claim 1 or 2, wherein said second amplifier is biased by a small DC bias voltage for reducing the power loss.

6. The circuit of claim 1 or 2, wherein said zener diode has a zener voltage of small value for reducing power loss.

7. The circuit of claim 1 or 2, wherein the resistance of said second resistor in said discharge path of said capacitor is selected to be less than the respective input DC resistance of said charging path.

8. The circuit of claim 1 or 2, wherein said reference wave signal applied to said second comparator means has a triangular or sawtooth waveform.

9. The circuit of claim 1 or 2, comprising a telephone set which provides a telephone signal by pulse code modulation coding with a frequency that is a multiple of the frequency of said reference wave signal.

10. The circuit of claim 1 or 2, wherein the frequency of said reference wave signal is selected such that the value of said capacitor of said switching transistor circuit is as small as possible within the limit of said time constant of said charging path.

11. the circuit of claim 5, wherein said DC bias voltage is selected to be approximately 3 volts.

12. The circuit of claim 6, wherein the value of said zener voltage is selected to be approximately 3 volts.

13. The circuit of claim 3, wherein each of said first and second output resistors is provided with a small resistance.

14. The circuit of claim 3, wherein said second amplifier is biased by a small DC bias voltage for reducing the power loss.

* * * * *